Figure 6:
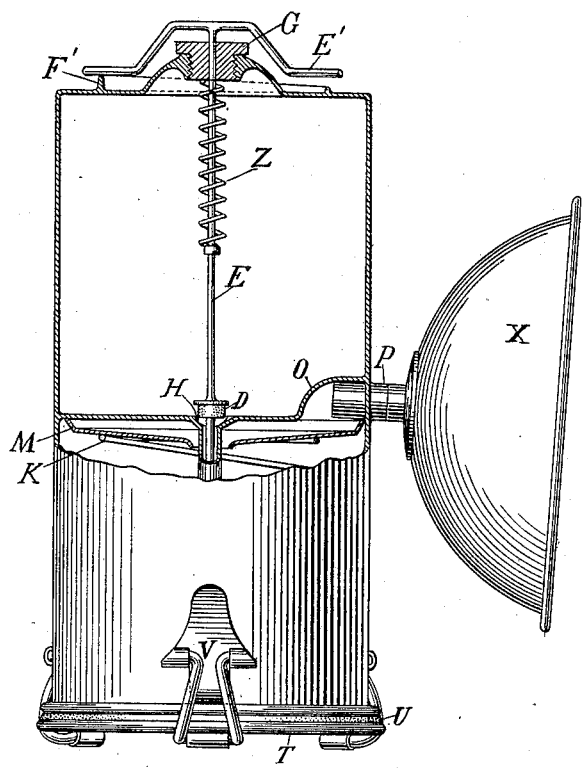

No. 656,874. Patented Aug. 28, 1900.
F. E. BALDWIN.
ACETYLENE GAS LAMP.
(Application filed Oct. 18, 1899.)
(No Model.) 2 Sheets—Sheet 1.
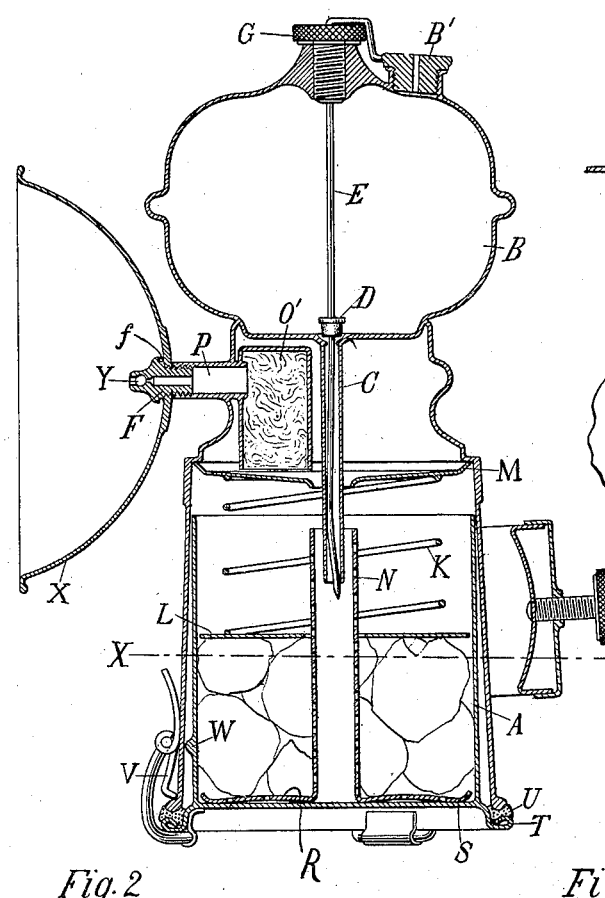
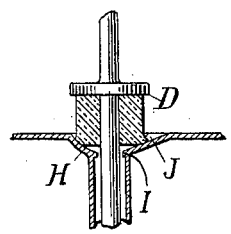
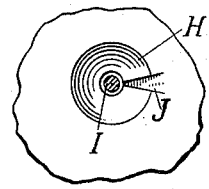
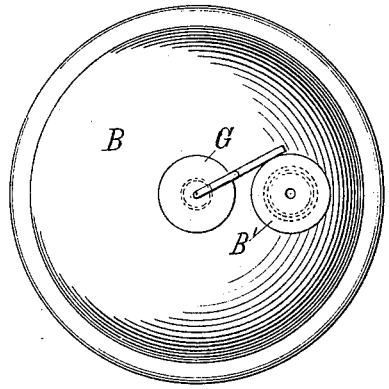
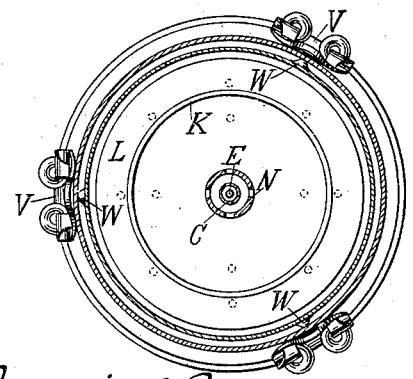
Witnesses:
Frederic E. Baldwin, Inventor
by Ken, Page & Cooper Att'ys No. 656,874. Patented Aug. 28, 1900.
F. E. BALDWIN.
ACETYLENE GAS LAMP.
(Application filed Oct. 18, 1899.)

(No Model.) 2 Sheets—Sheet 2.

Witnesses:

Frederic E. Baldwin Inventor by *Ken, Page Cooper* Att'ys

United States Patent Office.

FREDERIC E. BALDWIN, OF NEW YORK, N. Y.

ACETYLENE-GAS LAMP.

SPECIFICATION forming part of Letters Patent No. 656,874, dated August 28, 1900.

Application filed October 18, 1899. Serial No. 733,973. (No model.)

*To all whom it may concern:*

Be it known that I, FREDERIC E. BALDWIN, a citizen of the United States, residing at New York, (New Brighton,) in the county of Richmond and State of New York, have invented certain new and useful Improvements in Bicycle-Lamps, of which the following is a specification, reference being had to the drawings accompanying and forming a part of the same.

The invention subject of my present application for patent is an improvement in lamps more especially designed for use as bicycle or carriage lamps, but capable also of general use and adapted to burn acetylene or similar gas.

The improvements reside in novel features and details of construction which render such lamps more reliable and economical in operation and secure a more durable and simple construction.

Lamps of the general class to which my invention pertains comprise a compartment for containing calcium carbid, a water-reservoir, a valve for permitting and controlling the flow of water to the carbid, and a burner or orifice at which the issuing gas is ignited. This general type of lamp is shown in the drawings hereto annexed, in which my improvements are illustrated.

Figure 7:
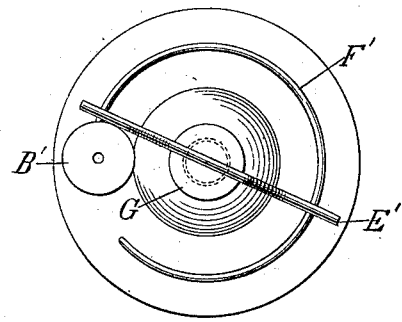
Figure 8:
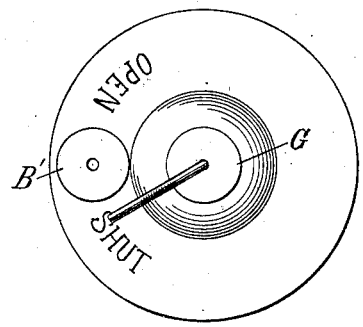

Figure 1 is a central vertical section of the lamp constructed with special reference to its use as a bicycle or carriage lamp. Fig. 2 is a top plan view of the same. Fig. 3 is a horizontal sectional view of the carbid-compartment on line $x\ x$ of Fig. 1. Fig. 4 is an enlarged vertical section of the valve. Fig. 5 is an enlarged plan view of the valve-seat. Fig. 6 is a view in part section of a lamp exhibiting certain modifications in details of construction. Fig. 7 is a top plan view of Fig. 6. Fig. 8 is a top plan view of the lamp, showing a valve-stem similar to that employed in Fig. 1.

Referring to Fig. 1 for a general description of the device, A is a receptacle for containing calcium carbid.

B is a water-reservoir.

C is a tube extending from the latter down into the former.

D is the valve, E the valve-stem, and F the burner.

Inasmuch as my improvements relate to the construction of the several parts rather than to that of the lamp as a whole I shall consider the said improvements under separate heads.

The water-valves for lamps of this description as heretofore constructed have not met satisfactorily the requirements of practical use. It is generally true of all of them that the tendency to become clogged up by the sediment and impurities in the water soon renders them inoperative. If a needle-valve is employed, the acid in the gas is apt to corrode the contacting surfaces, so that they leak, while if some ordinary and simple form of cock is used it is very difficult to regulate the flow of water through it properly. In order to avoid these objections, I have devised a valve which is constructed as follows: In the top of the water-reservior B is a threaded aperture into which fits a screw plug or cap G. This plug is perforated axially, and through it passes and to it is secured a wire E, the projecting end of which is bent over to form an index or pointer for the valve. On the portion of the wire which extends down through the water-reservoir and at the proper point thereon is a flange to which is cemented an annular washer, of soft rubber or similar material D, which constitutes the facing of the valve.

The seat for the valve is formed, preferably, in the bottom plate of the reservoir B and consists of a dish-shaped or conical depression H with a small hole I in the center. Extending from the outer edge of the depression to the central hole is a groove or depression J, gradually tapering toward the hole.

To the under side of the plate or bottom of the reservoir B is secured a tube C, which surrounds the hole I and extends down into the carbid-chamber A. The valve-stem E is prolonged below the valve and extends through the hole I and tube C. It is formed with a pointed end and is either fashioned or simply bent so as to bear against the side of the tube C and also on the inner surface of the end of the same.

The action of the valve is as follows: The wire or stem E is inserted through the water-reservoir and the end passed down through the hole I and the tube C. The cap or plug is then screwed down until the pressure of the valve D on its seat is sufficient to prevent the flow of water from the reservoir. The latter is then filled through an orifice by a screw-plug B'. To allow the water to flow into the carbid-chamber, the plug or cap G is turned so as to raise the valve off from its seat. If the valve-seat be a smooth or plane surface, no water begins to flow, owing to capillary attraction, until the valve is fully opened, but then the flow may be too free; but if the tapered groove J be present the water begins to flow as soon as the pressure upon the rubber valve permits the latter to rise out of the groove. By this means an extremely-nice adjustment of the valve and accurate control of the flow of water are secured. The bend in the wire or stem E, which latter has a certain resilience, acts as a brake on the valve and prevents its turning when the lamp is jolted, as by running over rough roads. It moreover serves to scrape off from the inside of the tube with which it is in contact any deposit or incrustation that may form thereon, especially at the end, this cleaning action being effected whenever the stem is turned to open or close the valve. By extending the stem E slightly beyond the end of the water-tube and bringing it to a sharp point a special advantage is secured. If the water be dropped from the end of the tube, the drops are held on the latter by capillary attraction until they become quite large. This is a disadvantage in a lamp provided with a small burner and renders it almost impossible to maintain a steady flame, but by the means I have devised the water constantly flows to the point of the stem or wire, and as the latter affords only a fine point for adhesion the water is delivered in minute drops.

The valve, as above described, has the advantage of being extremely durable, since the rubber, the only part subject to deterioration, may be readily replaced; of being capable of very fine adjustment; of being readily removed for cleaning in case it becomes clogged, and of being simple and cheap in construction.

Tubes for delivering water from the reservoir to the carbid-chamber have heretofore been used; but, so far as I am aware, they have been designed merely with the object of conveying such water as escaped through the valve to the point at which it was delivered to the carbid; but the water-tube in my improved lamp has a special function in addition to this, and is designed in accordance with a definite plan or principle to accomplish a highly-useful result, which will be readily understood from the following consideration of a simple phenomenon.

It is a known fact that every acetylene-burner requires for its best operation and according to its special construction a certain pressure of gas. In constructing my lamps, after deciding on the special form of burner to be used and determining that pressure of gas with which it burns best, I make the water-tube of such length that the mean height of the water in the reservoir added to the length of the tube will afford a pressure approximately equal to that which the lamp requires. The result will be that should the pressure in the gas-chamber become too great the supply of water will be automatically shut off, but as soon as the pressure in the gas-chamber becomes normal or less the water will drop slowly or rapidly, as may be required. The specific nature and purpose of this feature of my invention will be more fully understood if the gas-chamber be considered as a closed air-tight flask or receiver, through the stopper of which a tube of small bore is passed, so as to extend some distance down into the flask. Water may be poured down through the tube and into the flask until the pressure of air in the latter equals that produced by the column of water in the tube. If the pressure within the flask be increased by any means, the whole column of water will be driven up through the tube. The air will not, in other words, rise through the tube while the water descends nor pass up in bubbles, but the whole body of water will be forced up. So, also, should air be permitted to escape from the bottle the water will drop from the tube in proportion to the rate at which the air escapes. In my lamp the tube and water-reservoir contain a column of water which is as nearly as possible of a height to give that pressure which the lamp is designed to use. The bore of the tube which contains the stem is so small that it is at all times either filled with water or entirely empty. Hence if the height of the water column is not subject to material variation, it affords a very effective means of automatic regulation of the water-supply to the carbid-chamber. I have observed that when the tube is contracted at one point, as by the valve, the hard shaking of the lamp in use will not overcome the restraining pressure of the gas even though the position of the valve be such as to admit under normal conditions a flow of water largely in excess of the requirements of the lamp. The pointed valve stem or wire above described is particularly useful in this connection, for should the drops come from a round tube too much water will be delivered in each drop, causing too much carbid to become saturated and an excess of gas to be generated, which before it can be automatically controlled would cause the lamp to flare up. With my arrangement, on the contrary, several small drops are required to produce any pronounced effect.

In lamps of this general type, in which the water-reservoir and not the combustion-chamber is above the carbid or gas compartment and as heretofore generally constructed, the gas-pipe leading to the burner is located at or near the top of the carbid-compartment; but when carbid is slaked with water many impurities are given off and carried up with or by the gas. As this gas is warm and charged with moisture it is condensed on coming in contact with the cooler walls of the chamber and deposits the impurities which it contains thereon. To prevent these impurities from reaching the burner, a filter of some description is used in or near the gas pipe or outlet; but this filter may become clogged at any moment, thus rendering the action of the lamp imperfect and unsatisfactory until it has been thoroughly cleaned. I overcome this difficulty in the following manner: In the carbid or gas chamber I place two disks or plates of slightly-smaller diameter than the chamber and which for convenience are attached to the opposite ends of a spiral spring K. One of these plates L is designed to press upon the mass of carbid and prevent the same from displacement and the other disk or plate M bears against the top of the carbid-compartment or against suitable ledges or shoulders therein near the top of the same. Both of said plates contain central openings, that in the plate M to permit the passage of the water-tube C and that in the plate L to permit the passage of the upright water-distributing tube N. The upper plate M is of solid metal, except for the central perforation, and in all cases is so constructed or arranged as to leave a space between it and the bottom of the water-reservoir. In such a form of lamp as is shown in Fig. 1 this space is formed by an intermediate section of the body of the lamp, but in other forms of lamp, such as that shown in Fig. 6, where the bottom of the water-reservoir is substantially flat, the necessary space is secured by giving to the plate M the form of a dish, so that only its upturned edges bear against the bottom of the water-reservoir. The orifice of the pipe which conducts the gas to the burner is arranged so as to lie approximately midway between the center and edge of the disk, so that the gas arising from the saturated carbid and passing up around the edges and through the center of the disk is forced to follow a tortuous path with sharp turns before it enters the gas-pipe. I have found that by thus deflecting the course of the gas and utilizing the cooling effect of the upper disk or plate M practically all of the impurities will be deposited on the under side of the plate M, while the top of the carbid-chamber and the gas-filter are kept practically clean. It will be understood that it is not essential that the plate M should be detachable, but it is desirable to make it so in order that it may be removed and cleaned whenever the lamp is filled.

Another objection to lamps of this class arises from the condensation of moisture on the cool interior surfaces of the lamp. This at times is the cause of great annoyance, as the amount of moisture deposited may be so great as to run down the sides of the lamp, even entering the gas-pipe and entering the filter. This causes the lamp to flicker and sometimes to go out entirely. To avoid this, I arrange the orifice of the gas-pipe in such manner that the condensed moisture will not have a chance to enter it as it runs down the sides of the lamp. In the cheaper forms of lamp I secure this result by forming in the bottom of the water-reservoir an indentation O, into which the gas-pipe P opens, so that the orifice of the latter is above the under surface of the bottom of the water-reservoir. A preferred construction, however, and one which I employ in the better class of lamps is that shown in Fig. 1, in which a small cylinder or thimble O' is secured to the gas-pipe P. The lower end of the cylinder O' is open, and the gas passes up through the cylinder to the gas-pipe P, which communicates with the interior of the cylinder near its upper end. The cylinder O' is also conveniently used as a receptacle for the filtering material. When the cylinder or thimble is thus arranged, so that it does not touch at any point any of the cooler surfaces of the lamp, but is entirely surrounded by the hot gas, there will be little or no condensation of moisture in it and no tendency for the moisture to find its way into the gas-pipe. This also affords an opportunity for employing a large filtering-surface, which is necessary for satisfactory results.

In order to distribute the water to the carbid in lamps of this kind, perforated tubes have been used in some cases, inclosed in a porous jacket of cloth or the like and attached to solid bottom plates. Perforated bottom plates have also been used with imperforate tubes; but in the former construction the carbid is apt to collect in the bottom of the tube, and it is difficult to clean it out, so that when a long water-tube, which is necessary to afford the required pressure of gas, is used the end of the tube is apt to become embedded in the old carbid which accumulates, thus preventing the flow of water. When the latter form is employed, it is sometimes found on attempting to relight the lamp after it has been once used that the old carbid has become caked on the bottom plate, and the water is therefore held back and rises in the tube until it overflows, thus leaving a column of water in the tube in the carbid-chamber which is uncontrolled. Should this column of water eventually break through the dry carbid, a great excess of gas is developed. To avoid these objections, I employ in my lamp a tube open at both ends and formed in any manner to permit the percolation of water through its sides and a bottom plate which is also perforated to a greater or less extent, according to the size and requirements of the lamp. By this means the tube, which is open at both ends, is readily cleaned, and should the water be prevented from reaching the carbid through the perforations in the disk it can still gain access to it through the porous or foraminous sides of the vertical tube. This construction is shown in Fig. 1, in which N designates the vertical foraminous tube, and R the foraminous bottom plate or disk.

Another feature of novelty in my lamp resides in the means for closing the carbid-compartment. To do this, I attach the receptacle for the carbid to or make it in one piece with the bottom plate of the lamp, so that the lamp is opened and closed by the withdrawal or insertion of the receptacle. This is shown in Fig. 1, in which A is the cup or receptacle for the carbid, and S the bottom plate. This latter has a flange T, upon which a rubber washer U is laid, which affords a seat for the edge of the lamp-base. The bottom plate is joined to the lamp and the joint rendered airtight by any suitable clamps V. It is, however, inadvisable to make the receptacle A fit snugly in the lamp-base, because the surfaces of the two are liable to become incrusted; but if the receptacle A does not fit snugly it is difficult to find a simple form of clamp to bind the flanges of the lamp-base and bottom plate that may be applied without forcing the receptacle over to one side or out of center, so that while two clamps grip the edges properly the third will be forced too far from its proper position. To obviate this, I form or apply studs or projections W on the receptacle A or the inner wall of the base of the lamp, which will center the receptacle. These studs cut through the incrustation when the receptacle is withdrawn or inverted and keep the latter properly centered in the lamp.

Another feature of my invention resides in the form of burner which I have devised. This consists of a plug F, containing a longitudinal perforation or passage. At a point near the tip this passage is contracted, so that the gas issues in a fine jet into the bore of larger diameter at the tip or end. In the sides of the plug perforations Y are formed, which open into the bore between the contracted orifice and the tip of the plug at a distance from the tip which is not arbitrary, but which must be carefully determined, so that the gas will not issue through the openings Y, which latter are made relatively large, so that as the gas-jet issues it draws with it through the transverse openings a large proportion of air. I have found that by this plan of construction I am enabled to use a brass plug or tip in lieu of one composed of more refractory material and that the deposition of carbon or smoking by the flame is effectually prevented and the burner kept comparatively cool.

In Figs. 6 and 7 I have shown a modified form of the devices for opening the valve. When an ordinary screw-plug G is used, the valve-stem must be secured to it in a certain position, so that the bent end, which serves as an index, will indicate by its position whether the valve is open or closed. With this arrangement it is presupposed that a given rotary movement of the plug G will result in a corresponding upward or downward movement of the stem, which will correspondingly open or close the valve; but this also presupposes that the thickness and elasticity of the rubber washer of the valve remain always the same, which is not the case. It may happen, therefore, after a certain period of use that the position of the index is not a true indication of the condition of the valve. To avoid this I have used the device shown in Figs. 6 and 7. The valve-stem E in this case passes freely through the plug G; but a spiral spring Z between the plug and a collar on the stem acts to force the valve down upon its seat whatever may be the position of the plug. To the end of the stem E, which projects above the plugs there is secured a bar or wire E', which is bent down so as to bear upon a circular cam-head F' on the top of the lamp. When the cross-piece E' rests upon the lower end of the cam F', the valve is entirely closed; but when it is turned and caused to travel up the cam to its higher end the valve is fully opened. It is evident that intermediate positions of the cross-bar on the cam will determine the extent to which the valve is opened, and a very nice adjustment of the latter may be in this way secured.

Another feature of novelty which I have devised is in securing the burner to the reflector or making the two practically in one, so that the use of tools will not be required for removing the burner for cleaning it, the leverage afforded by the reflector enabling one to unscrew the burner whenever necessary. For this purpose the plug F is formed with a shoulder $f$ and is threaded up to the same. The threaded portion of the plug is then screwed into the threaded opening in the reflector X until the latter abuts against the shoulder. By a suitable tool the metal of the reflector is jammed into the threads of the plug or caused to break down the threads, or by any other convenient means the plugs and reflector are firmly united. I do not, however, make claim in this application to the improvement in the burner and reflector herein shown and described.

Having now described my invention, what I claim is—

1. In a lamp of the kind described, the combination with a water-reservoir, a carbid-compartment and a tube leading from the reservoir into the carbid-compartment, of a plug closing and opening into the reservoir, a stem carried by the plug and extending through the reservoir and water-tube and a valve secured to, or carried by, the stem and controlling the passage from the reservoir into the said tube, as set forth.

2. In a lamp of the kind described, the combination with a water-reservoir, a carbid-compartment and a tube leading from the reservoir into the carbid-compartment, of a valve controlling the passage from the reservoir to the tube, and a valve-stem extending through the reservoir and water-tube, the said stem being fashioned or bent so as to bear against the inner wall of the tube and thereby act as a brake to prevent the stem from turning, as set forth.

3. In a lamp of the kind described, the combination with a water-reservoir, a carbid-compartment and a tube leading from the reservoir into the carbid-compartment, of a valve controlling the passage from the reservoir to the tube, and a valve-stem extending through the reservoir and water-tube and fashioned or bent so as to bear against the inner surface of the tube at the end of the same, to act as a cleaner to remove deposits thereon, when the stem is rotated, as set forth.

4. In a lamp of the kind described the combination with a water-reservoir, a carbid-compartment and a tube leading from the reservoir into the carbid-compartment, of a valve controlling the passage from the reservoir into the tube, and a valve-stem prolonged below the valve and extending through the water-tube, said stem being adapted to bear against the inner wall of the tube and thereby act as a brake to prevent rotation of the valve on its seat, as set forth.

5. In a lamp of the kind described, the combination with a water-reservoir, a carbid-compartment and a tube leading from the reservoir into the carbid-compartment, of a valve controlling the passage from the reservoir to the tube, a valve-stem prolonged below the valve and extending through the tube and adapted to bear upon the inner surface of the latter at the end of the same and thereby serve as a cleaner to remove deposits thereon, when the stem is rotated, as set forth.

6. In a lamp of the kind described, the combination with a water-reservoir, a carbid-compartment and a tube leading from the reservoir into the carbid-compartment, of a screw-plug closing and opening in the reservoir, a stem carried by the plug, a valve on the stem controlling the passage from the reservoir to the tube, the stem being prolonged below the valve and extending through the tube and fashioned or bent so as to bear against the inner wall of the tube whereby it serves as a brake to prevent rotation of the stem, as set forth.

7. In a lamp of the kind described, the combination with a water-reservoir, a carbid-compartment and a tube leading from the reservoir into the carbid-compartment, of a plug closing an opening into the reservoir, a stem carried by the plug and extending through the reservoir and through and beyond the tube and formed at its end in a point, and a valve secured to, or carried by, the stem and controlling the passage from the reservoir into the said tube, as set forth.

8. In a lamp of the kind described, the combination of a water-reservoir, a carbid-compartment and a tube leading from the reservoir to the carbid-compartment, of a valve controlling the passage from the reservoir to the tube, a stem prolonged below the valve and extending through and beyond the tube, the said stem being fashioned or bent so as to bear on the inner wall of the tube at one or more points, and pointed at its end, as set forth.

9. In a lamp of the kind described, the combination with a water-reservoir, a carbid-compartment and a tube leading from the reservoir into the carbid-compartment, a valve controlling the passage from the reservoir to the tube and having an elastic facing, the seat for said valve being formed with a tapering groove extending from the opening or orifice in the seat, as set forth.

10. In a lamp of the kind described, the combination of a water-reservoir, a closed carbid-compartment, a tube leading downward from the reservoir into the carbid-compartment, and a valve controlling the passage from the reservoir to the tube, the length of the tube being fixed with reference to the mean height of the water in the reservoir so that the height of the water-column in the reservoir and tube may afford a pressure approximately equal to the gas-pressure for which the lamp is adapted, as set forth.

11. In a lamp of the kind described, in which the upper portion of the carbid-compartment is exposed to the cooling action of the air or of the water-reservoir and not to the heat produced by the flame, the combination with the carbid-compartment of a receptacle for the carbid contained within the said compartment, a disk or plate covering the mass of carbid in the receptacle, a second disk or plate covering the upper end of the compartment, but so as to leave a free space between itself and the said end, the disk or plate having a central opening and fitting loosely against the upper end of the compartment, a spring interposed between the two disks or plates and acting to maintain them in position, and a gas pipe or outlet leading from the space above the upper disk or plate and having its orifices out of line with the passages through and around the same, as set forth.

12. In a lamp of the kind described, the combination with the carbid-receptacle, of a foraminous tube open at both ends, secured to a bottom disk or flange having perforations therein, and adapted to stand in the receptacle and distribute water to the surrounding and superposed mass of carbid, as set forth.

13. In a lamp of the kind described, the combination with the lamp-case of a carbid-receptacle adapted to enter the open lower end of the case, but of smaller diameter than the case, the receptacle and case being formed or provided with flanges, clamps for engaging and binding together the said flanges, and studs or projections on the receptacle for centering it in the case, as set forth.

14. The valve device for lamps of the kind described, comprising in combination a plug adapted to close an opening in the water-reservoir, a valve-stem passing freely through said plug, a spring interposed between the plug and the stem and acting to force the stem down so that the valve is pressed against its seat, a cam on the lamp-case, and an arm on the valve-stem bearing thereon, whereby the stem is raised or lowered according to the position of said arm on the cam, as set forth.

FREDERIC E. BALDWIN.

Witnesses:
M. LAMSON DYER,
DRURY W. COOPER.